(12) United States Patent
He (10) Patent No.: US 12,047,020 B2
(45) Date of Patent: Jul. 23, 2024

(54) BOX-TYPE WIND POWER GENERATION DEVICE AND POWER GENERATION DEVICE SET

(71) Applicant: Chongqing University, Chongqing (CN)

(72) Inventor: Xuefeng He, Chongqing (CN)

(73) Assignee: Chongqing University, Chongqing (CN)

( * ) Notice: Subject to any disclaimer, the term of this patent is extended or adjusted under 35 U.S.C. 154(b) by 588 days.

(21) Appl. No.: 17/398,544

(22) Filed: Aug. 10, 2021

(65) Prior Publication Data

US 2022/0381219 A1   Dec. 1, 2022

(30) Foreign Application Priority Data

May 31, 2021 (CN) .......................... 202110605953.0

(51) Int. Cl.
*H02N 2/18* (2006.01)
*F03D 5/00* (2006.01)

(52) U.S. Cl.
CPC ............... *H02N 2/186* (2013.01); *F03D 5/00* (2013.01); *Y02E 10/72* (2013.01)

(58) Field of Classification Search
CPC .......... H02N 2/186; H02N 2/185; F03D 5/00; F03D 5/06; F03D 9/25; F03D 3/005; F03D 13/20; F03D 80/00; Y02E 10/72; Y02E 10/728; Y02E 10/74; Y02P 70/50
See application file for complete search history.

(56) References Cited

U.S. PATENT DOCUMENTS

| | | | |
|---|---|---|---|
| 2006/0108809 A1* | 5/2006 | Scalzi | B60L 8/00 290/55 |
| 2017/0012430 A1* | 1/2017 | Gillett | H02J 3/381 |

* cited by examiner

*Primary Examiner* — Emily P Pham
(74) *Attorney, Agent, or Firm* — Schwegman Lundberg & Woessner, P.A.

(57) ABSTRACT

A box-type wind power generation device and a power generation device set is provided, the box-type wind power generation device includes a box body, a first energy collecting unit and a first connection member. The box body includes at least one flexible housing member and at least one rigid housing member which enclose at least one sealed cavity. The first energy collecting unit includes a piezoelectric membrane and electrodes deposited on both sides of the piezoelectric membrane, respectively; the first energy collecting unit overlying on an inner wall of the flexible housing member and are located in the sealed cavity. An end of the first connection member is fixed to the flexible housing member so that the first connection member is connected to the box body and at least a part of the first connection member is located outside the sealed cavity.

15 Claims, 6 Drawing Sheets

BOX-TYPE WIND POWER GENERATION DEVICE AND POWER GENERATION DEVICE SET

CROSS-REFERENCE TO RELATED APPLICATIONS

This Non-provisional application claims priority under 35 U.S.C. § 119(a) to Chinese Patent Application No. 202110605953.0, filed on 31 May 2021, the entire contents of which are hereby incorporated by reference in its entirety.

TECHNICAL FIELD

The disclosure relates to a technical field of wind power generation, in particular to a box-type wind power generation device and a power generation device set.

BACKGROUND ART

There is an urgent demand for wireless sensor network technologies in various fields such as Smart City, large-scale infrastructure health monitoring, environmental monitoring and the like, and a wireless sensor node is a basic unit for building a wireless sensor network. Most wireless sensor nodes are powered by traditional chemical batteries, which carry limited energy and need to be replaced or charged during operations. For a wireless sensor network with many nodes, replacing or charging of the batteries not only consumes a lot of time, money and manpower, but also is difficult to complete in some cases, for example, for wireless sensor nodes located in dangerous environments. Wind energy is a kind of green renewable energy widely existing in nature. A small- or micro-scale wind power generation device that converts the wind energy into electric energy has advantages such as long working life and no pollution and the like, and can be used to replace the chemical batteries to supply power to the wireless sensor nodes.

There are two types of small- or micro-scale wind power generation devices, a first is a turbine wind power generation device similar to a large-sized wind power generation device, and the other is a wind power generation device based on wind-induced vibration phenomenon. The structure of the first one is more complex. The structure of the second one is simpler and prone to miniaturize. However, whether it is a turbine wind power generation device or a wind power generation device based on the wind-induced vibration phenomenon, only when the wind speed is greater than a cut-in wind speed (onset wind speed) and varies within a specific range, will it have a higher electrical output.

Furthermore, depending on different electromechanical conversion mechanisms, the small- or micro-scale wind power generation devices can be classified as a piezoelectric power generation device, an electrostatic power generation device, an electromagnetic induction power generation device, and a triboelectric power generation device. Compared with other power generation devices, the piezoelectric power generation device requires no external voltage input, with ease of manufacturing, relatively high power density and more ease of miniaturization. However, the wireless sensor node used in fields such as large-scale infrastructure health monitoring and environmental monitoring is required to operate in the field for a long time, and the wind power generation device that supplies power to them also is required to operate in the field environment for a long time. In the piezoelectric wind power generation device based on the wind-induced vibration, a piezoelectric composite beam/ membrane is used to convert vibration energy into electric energy. The piezoelectric composite beam/membrane of the piezoelectric wind power generation device that has been reported currently is directly exposed to external environment, and piezoelectricity of piezoelectric materials will be greatly degrade due to exposure to sunlight and rain. Moisture in the environment (including acid and alkali liquids) corrodes the metal electrodes, and dust in the air can easily adhere to the membrane and change its dynamics of the membrane. Therefore, it is difficult for the existing piezoelectric wind power generation device to meet requirement of a long-term stable operating in the field in stability and reliability.

SUMMARY

An object of the disclosure is to provide a piezoelectric wind power generation device which is simple in structure and suitable for long-term operating in the field.

In order to solve the above technical problem, a box-type wind power generation device provided in the present disclosure includes a box body, a first energy collecting unit and a first connection member. The box body includes a flexible housing member and a rigid housing member which enclose to form at least one sealed cavity. The first energy collecting unit includes a piezoelectric membrane and electrodes deposited on both sides of the piezoelectric membrane; the first energy collecting unit overlies an inner wall of the flexible housing member and is located in the sealed cavity. An end of the first connection member is fixed to the flexible housing member so that the first connection member is connected to the box body and at least a part of the first connection member is located outside the sealed cavity.

In the box-type wind power generation device provided in the disclosure, after the part of the first connection member located outside the sealed cavity is mounted on a certain object, the flexible housing member and the rigid housing member respectively serve as a component of the box body, and movement of the rigid housing member under an action of wind will inevitably drive the flexible housing member to deform, and the first connection member is connected with the flexible housing member so that the rigid housing member is indirectly connected with the first connection member through the flexible housing member, and the first connection member is not directly connected with the rigid housing member. Therefore, the flexible housing member deforms with wind-induced vibration of the box body, which causes change in stress in the piezoelectric membrane, and further causes change in voltage between the electrodes on both sides, which can supply power to electrical loads through a subsequent management circuit. Moreover, when the box body vibrates, the rigid housing member will not deform, and vibration of the box body is completely caused by deformation of the flexible housing member. Furthermore, a totally enclosed box body is adopted in this disclosure, and the energy collection unit is arranged in the sealed cavity inside the box body, so as to avoid the influence of rain and dust on the energy collection unit and meet the requirement of long-term stable operation in the field. In addition, the power generation device in this disclosure is small in size and compact in structure.

In this disclosure, "the flexible housing member and the rigid housing member enclose to form at least one sealed cavity" includes not only the flexible housing member and the rigid housing member directly enclosing at least one sealed cavity, but also the flexible housing member, the rigid housing member and a first end of the first connection member enclosing at least one sealed cavity.

Optionally, the box-type wind power generation device further includes a base. The other end of the first connection member (that is, the part of the first connection member located outside the sealed cavity) is fixed to the base, and the base can be connected with ground, a desktop, a building surface, a tree or the like. The base is not necessarily located at a lower side of the box body, and a positional relationship between the base and the box body is determined depending on installation conditions. In other embodiments, for example, when the base is connected to an underside of a bridge girder, the base is located at an upper side of the box body.

Optionally, in order to avoid influence of sunlight, rain, dust, corrosive substances and the like on performance of the piezoelectric membrane, the rigid housing member and flexible housing member of the box body shall be made of lightweight, impermeable and corrosion-resistant materials. For example, the rigid housing member may be made of aluminum, glass fiber reinforced plastic, plastic or other materials, and the flexible housing member may be made of polymer membrane, plastic membrane or other materials, and lightweight materials facilitate enhancement of the wind-induced vibration of the box body. The first connection member and the base can be made of high-strength, impermeable and corrosion-resistant materials, such as stainless steel, aluminum or plastic or other materials. As the box body housing isolates the piezoelectric membrane from the external environment and effectively isolates influence of the external environment on the piezoelectric wind power generation device, the piezoelectric wind power generation device provided in the disclosure presents potentials of operating in the field for a long time.

Optionally, the piezoelectric membrane can be made of piezoelectric materials such as lead zirconate titanate (PZT), polyvinylidene fluoride (PVDF), aluminum nitride (AlN) or piezoelectric fiber composite material (MFC), and upper and lower surfaces of the piezoelectric membrane are coated with metal (such as aluminum or the like) as electrodes to connect with external circuits.

Optionally, the box-type wind power generation device further includes a second energy collecting unit, which can be a piezoelectric composite beam, i.e. a beam overlaid with a piezoelectric membrane on part of its surface, and metal electrodes are deposited on both sides of the piezoelectric membrane. The second energy collecting unit is located in the sealed cavity. An end of the piezoelectric composite beam is fixed to a second connection member, and the other end of the piezoelectric composite beam is bent and connected with an inner wall of the rigid housing member. Provision of the second energy collection unit can increase energy collection efficiency, but it will lead to an increase in an operating wind speed. A contraflexure point is moved outwards by provision of the bending, and "moved outward" in this disclosure refers to moving in a direction away from a center of the box body. The bending can be directly formed by bending the piezoelectric composite beam, or it can be a spring or other telescopic structures.

Optionally, the first connection member and the box body can be an axisymmetrical body or a nonaxisymmetrical body in shape. The axisymmetrical body includes a cylinder, a sphere, a cone, a truncated cone or a spherical cap, and the nonaxisymmetrical body includes a prism or an elliptic cylinder. For example, when the box body is a cylindrical axisymmetrical body, wind from the top surface or from the side surface exerts aerodynamic force on the rigid housing member, so that a wind direction range for a normal operation of the power generation device is very large. When the box body has a central axis, for example, when the box body is the axisymmetrical body, the first connection member can deviate from an axis of the box body, that is, a position where the flexible housing member is fixed to the connection member can deviate from a center of the box body. At this time, if there are multiple second energy collection units, lengths of different second energy collection units can be different; in this way, collection efficiency of the wind in different directions by the wind power generation device is different. This arrangement is more suitable for environments where the wind direction varies relatively small.

The first energy collecting unit extends from an end of the first connection member to an edge of the flexible housing member. The second energy collecting unit extends from an end of the second connection member to the rigid housing member. Optionally, the flexible housing member has a contraflexure line formed by contraflexure points, and the first energy collection unit is located inside the contraflexure line. During the wind-induced vibration of the box piezoelectric wind power generation device, strains of the piezoelectric layer at different positions is not necessarily synchronous. For the wind power generation devices with and without the second energy collection unit in the cylindrical box body, their movements and strains of the piezoelectric layer are similar. For ease of description, a simple analysis is only made on the one without the second energy collection unit in the box body in the following. When the wind-induced vibration of the box body is translational in up and down directions, the flexible housing member and the first energy acquisition unit bend and present the contraflexure point (which is at a specific distance from the axis and at which bending moment and strain are zero, and a distance between the contraflexure point and the axis is determined by a vibration model of the energy collection unit (can also called the energy collector) in the up and down directions, which can be obtained by conducting modal analysis based on finite element method). The strains inside the contraflexure points (which refers to a distance from the axis is smaller than a radius at the contraflexure points) and outside (which refers to a distance from the axis is larger than the radius at the contraflexure point) are opposite in sign. In order to lead generated electric energy from a channel in a middle of the connection member to a vicinity of the base, it is assumed that all the first energy collection units are arranged on the flexible housing member inside the contraflexure points. In this case, when the vibration of the box body is translational in the up and down directions, strains of all the first energy collection units on the same flexible housing member are of a same sign, but when the wind-induced vibration of the box body is rotating in a certain direction in the horizontal plane, the strains of the first energy collection units on the same housing can be positive, negative or zero at the same time. When translational and rotatory vibrations exist at the same time, a distribution of the strains of the first energy collection unit is more complex, and the strains with opposite signs in the same first energy collection unit will cause charges to cancel. Therefore, in order to minimize this mutual cancellation, it is necessary to optimize a number and shape of the first energy collection units on the flexible housing member according to movement model of the wind-induced vibration of the box body. For example, four rectangular or fan-shaped piezoelectric membranes can be adhered to the flexible housing member on a top or bottom surface of box body of the power generation device as the first energy collection unit, or six or eight rectangular or fan-shaped piezoelectric membranes can be adhered as the first energy collection unit, which needs to be determined according to optimization results.

Optionally, for the above-mentioned box piezoelectric wind power generation device, if the flexible housing member and the second energy collecting unit adopt flat diaphragms or straight beams respectively, when the box body vibrates in the up and down directions, a large tensile stress will be generated in the flexible housing member and the second energy collecting unit, and bending stiffnesses of the flexible housing member and the piezoelectric composite beam will be significantly increased due to stress stiffening effect, resulting in a decrease in an amplitude of vibration of the box body and a decrease in its electrical output. Therefore, a corrugated structure can be added to an outer ring of the flexible housing member and piezoelectric composite beam (here, positions close to the rigid housing member) to relieve the stress and reduce influence of the stress stiffening effect. In addition, by adding the corrugated structure to the outer ring, the contraflexure point moves outward (toward a place farther away from the center), and at this time, the piezoelectric layer arranged inside the contraflexure points can be set longer, thereby improving the electrical output.

Optionally, at least a part of a bottom surface of the box body includes the flexible housing member, a side surface of the box body can be the rigid housing member, and at least a part of a top surface of the box body also includes the flexible housing member. Alternatively, in another possible embodiment, at least a part of the bottom surface of the box body includes the flexible housing member, the side surface of the box body can be the rigid housing member, and the top surface of the box body can be the rigid housing member. At this time, the moving outward of the contraflexure points means moving towards the rigid housing member. In some possible embodiments, because the side and top surfaces are rigid housing members, a structure of the device is relatively simple and facilitates reducing processing cost. Furthermore, the stiffness of the whole device can be reduced, thus reducing the cut-in wind speed (onset wind speed) of the whole device.

Optionally, when at least a part of the top surface of the box body is the flexible housing member, there are a plurality of first energy collection units which are respectively arranged on the inner wall of the flexible housing member on the top and bottom surfaces of the box body. The box-type wind power generation device can also include a second connection member which is located in the sealed cavity, an end of the second connection member is fixed to an end of the first connection member, and the other end of the second connection member is fixed to the flexible housing member on the top surface of the box body. The first connection member and the second connection member can be integrally formed or connected in two separate sections. A shape of the second connection member may or may not be the same as that of a cross section of the first connection member. In another feasible embodiment, when the top surface of the box body is the rigid housing member, a plurality of first energy collection units is all arranged on the inner wall of the flexible housing member on the bottom surface of the box body, and there is no need to provide the second connection member at this time. Optionally, the box-type wind power generation device may further include the second connection member. An end of the second connection member is fixed to an end of the first connection member, the other end of the second connection member may not be connected with the rigid housing member on the top surface, and the second energy collecting unit extending from an end of the second connection member to the rigid housing member may also be provided on the second connection member.

In view of a reliability problem that may exist when the piezoelectric membrane is adhered to the flexible housing member, the disclosure also provides a box-type wind power generation device, which includes a box body, a first connection member and a second energy collection unit. The box body includes a flexible housing member and a rigid housing member which enclose at least one sealed cavity. An end of the first connection member passes through the flexible housing member and into the sealed cavity. The second energy collecting unit is located in the sealed cavity, an end of the second energy collecting unit is fixed to the first connection member, and the other end of the second energy collecting unit is connected with an inner wall of the rigid housing member.

The first connection member can be integrally formed or composed of two parts, namely a first part and a second part. An end of the first part is fixed to the flexible housing member so that the first part is connected to the box body and located outside the sealed cavity. An end of the second part is fixed to the end of the first part fixed to the flexible housing member, and the second part is located in the sealed cavity.

Optionally, some other structures, shapes, connection modes and the like of the box-type wind power generation device can be provided as the first box-type wind power generation device mentioned above. For example, the box-type wind power generation device herein may also be provided with a first energy collecting unit, and the first energy collecting unit overlies the inner wall of the flexible housing member of the box body.

Wind speed and direction in natural environment vary with time and space. When the wind direction is constant, the wind energy collector has a higher electrical output only when the wind speed is greater than the cut-in wind speed (onset wind speed) and changes within a specific range. In addition, cut-in wind speeds of the wind energy collector in different directions are usually different. Expanding a wind speed range and a wind direction range with the high electrical output is an effective method to improve adaptability of the wind energy collector to a varying of an environmental wind field. In order to broaden the operating wind speed range and the wind direction range, the present disclosure also provides a wind power generation device set which includes a plurality of box bodies, a plurality of energy collection units and a connection member. One or more of the plurality of box bodies include a flexible housing member and a rigid housing member which enclose to form at least one sealed cavity, and one or more of at least one energy collection unit arranged in the sealed cavity are overlying on inner walls of the flexible housing members of different box bodies; or ends of one or more of the at least one energy collection unit are fixed to the connection member and the other ends thereof are connected with inner walls of the rigid housing members, and the connection member connect the flexible housing member of each box body in series to form a series structure.

Optionally, the box bodies in a same set can be set to be of a same shape. At this time, geometric dimensions of the box body bodies can be slightly different, and shapes of the box bodies can also be set to be different. A purpose of the above setting is to make the operating wind speed ranges and the wind direction ranges for respective box bodies in the same set slightly different, and make the operating wind speed ranges and the wind direction ranges of two adjacent box bodies be adjacent and have an overlapping interval, thus realizing continuous expansion of the operating wind speed range and the wind direction range for a structure of the same set. That is, when the wind speed and the wind direction continuously vary in a large range, it is possible to ensure that at least one box body has a high electrical output. The connection member is divided into several sections. After the sections are connected together, the whole connection member may not be straight. For example, it may be bent into a curved shape in a three-dimensional space as required. Using of this curved connection member is beneficial to further broaden the wind direction range.

To sum up, in the box-type wind power generation device provided in the disclosure, the flexible housing member deforms with the wind-induced vibration of the box body, which causes change in stress in the piezoelectric membrane, and further causes change in voltage between the electrodes on both sides, which can supply power to loads through a subsequent management circuit. However, when the box body vibrates, the rigid housing member will not deform, and the vibration of the box body is completely caused by deformation of the flexible housing member. Furthermore, a totally enclosed box body is adopted in this disclosure, and the energy collection unit is arranged in the sealed cavity inside the box body, meeting the requirement of long-term stable operation in the field. In addition, the wind power generation device in this disclosure has a simple structure, which greatly reduces the space occupied by the device and improves simplicity of the device.

DETAILED DESCRIPTION

The specific implementations of the present disclosure will be described in further detail with reference to the drawings and embodiments. The following examples serve to illustrate the present disclosure, but are not intended to limit a scope of the present disclosure.

In the present disclosure, plural means two and any number more than two.

In the present disclosure, a shape of a spherical cap refers to a shape of a part of a sphere cut off by a plane.

The axisymmetrical body in the present disclosure refers to a geometry surrounded by a closed curved surface formed by a rotation of a plane curve around a fixed line in a plane in which the plane curve is located, such as a ball, a cylinder, a cone, a truncated cone, a spherical cap, and the like.

Embodiment 1

Figure 1:
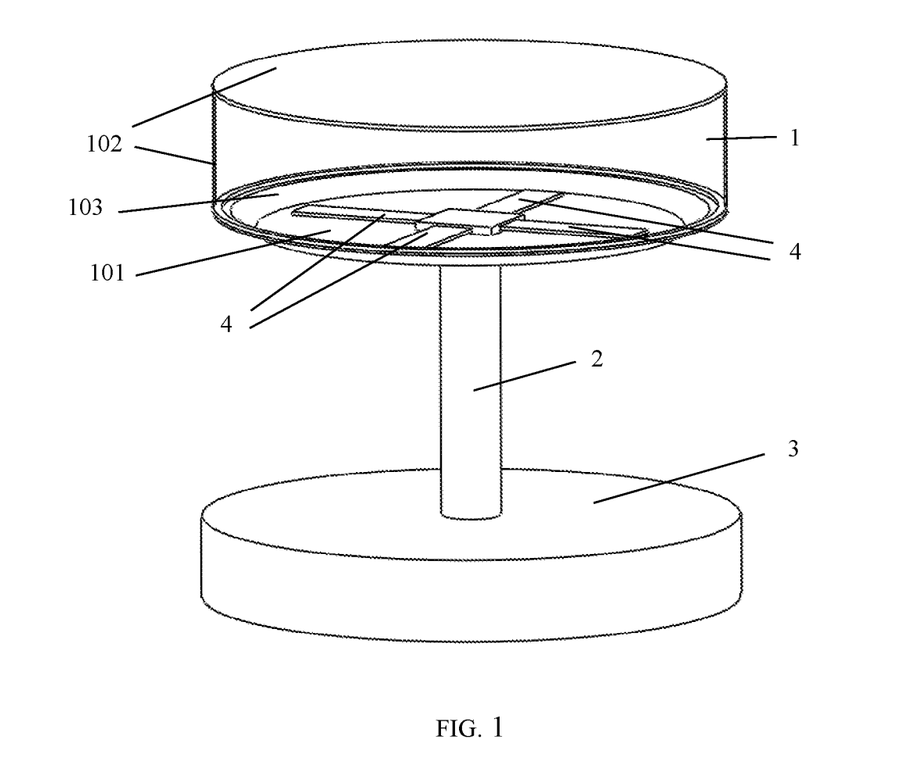
FIG. 1 is a schematic diagram of a piezoelectric wind power generation device according to Embodiment 1 of the present disclosure.

Referring to FIG. 1, Embodiment 1 provides a box piezoelectric wind power generation device which includes a cylindrical box body 1, a first connection member 2 and a base 3. The cylindrical box body 1 is composed of a flexible housing member 101 and a rigid housing member 102 which enclose to form at least one sealed cavity. A bottom surface of the cylindrical box body 1 is the flexible housing member 101, and both a side surface and a top surface of the cylindrical box body 1 are the rigid housing member 102. An end of the first connection member 2 is fixed with the flexible housing member 101, and the other end of the first connection member 2 extends toward outside of the sealed cavity and is fixed to the base 3 so that at least a part of the first connection member is located outside the sealed cavity. A plurality of piezoelectric membranes 4 are adhered to an inner surface of the flexible member 101, and both an upper and lower surfaces of the piezoelectric membranes 4 are overlaid with metal electrodes. A function of the flexible housing member 101 is to serve as an elastic member to connect the cylindrical box body 1 with the first connection member 2, that is, the box body 1 is supported on the first connection member 2 by the flexible housing member 101. A corrugated structure 103 is provided at a part of the flexible housing member on the bottom surface of the box body close to the rigid housing member to move contraflexure points of outward.

When the wind passes, the cylindrical box body 1 is subjected to a wind load, and the box body 1 supported by the flexible housing member 101 will generate wind-induced vibration on the first connection member 2. Deformation of the flexible housing member 101 causes deformation of the piezoelectric membranes 4 located on its inner surface. Due to a piezoelectric effect, an alternating potential difference can be generated between an upper and lower electrodes of the piezoelectric membranes 4, which can be used to supply power to electric objects such as a wireless sensor node.

Embodiment 2

Figure 2:
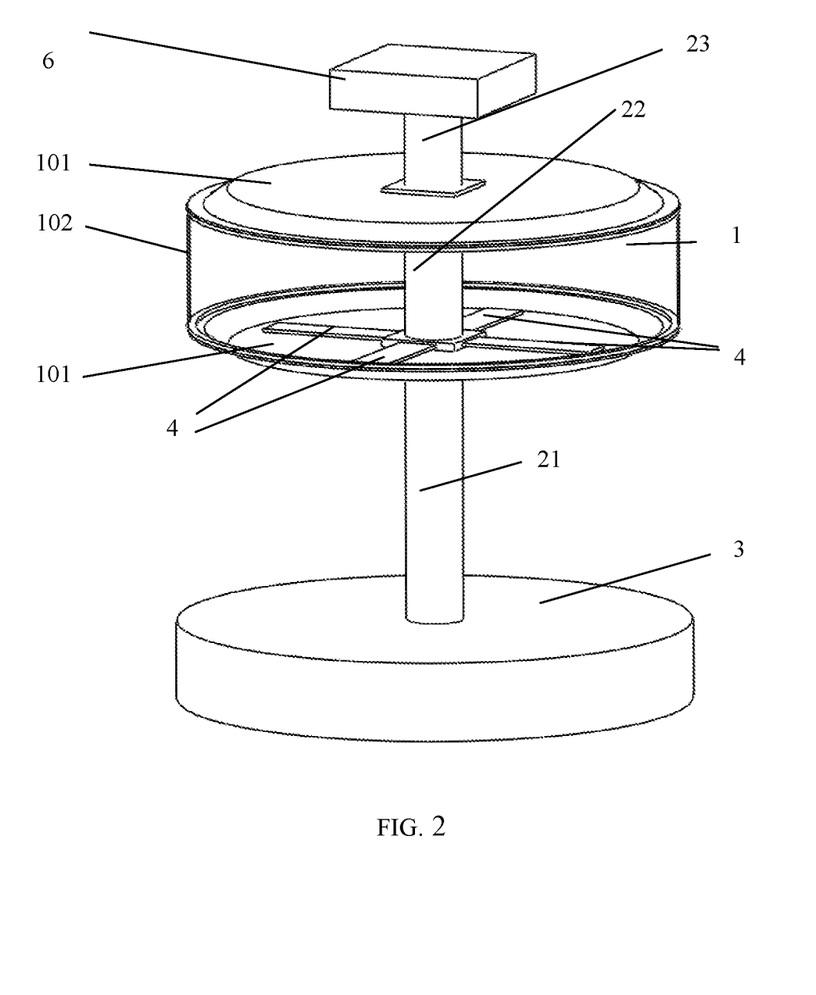
FIG. 2 is a schematic diagram of a piezoelectric wind power generation device according to Embodiment 2 of the present disclosure.

Referring to FIG. 2, on a basis of the Embodiment 1, the top and bottom surfaces of the cylindrical box body 1 are the flexible housing members 101, and the connection member is divided into two sections, namely a first connection member 21 and a second connection member 22. An end of the first connection member 21 is fixed to the flexible housing member 101 on the bottom surface of the box body 1, while the other end of the first connection member is fixed to the base 3. The second connection member 22 is partially located inside the box body 1, an end of the second connection member is fixed to an upper end of the first connection member 21, and the other end of the second connection member is fixed with the flexible housing member 101 on the top surface of the box body 1. The connection member also includes a third connection member 23. An end of the third connection member 23 is fixed to an upper end of the second connection member 22, and the other end of the third connection member extends toward outside of the sealed cavity, the other end of the third connection member is fixed with a rigid bluff body 6, and the rigid bluff body 6 can improve collection efficiency of wind blowing from an upper part to a lower part of the power generation device. In some other embodiments, the third connection member 23 and rigid bluff body 6 may not be provided. The inner surface of the flexible housing member 101, which serves as the top surface and the bottom surface of the box body 1, is adhered with the piezoelectric membrane 4, and both the upper and lower surfaces of the piezoelectric membrane 4 are overlaid with metal electrodes respectively. The cylindrical box body 1 is fixed to the first connection member 21 by the flexible housing members 101 on its bottom surface and top surface. When the box body 1 vibrates, the rigid housing member 102 does not deform, and the vibration of the box body 1 is completely caused by the deformation of the flexible housing members 101 on the bottom surface and top surface.

Under an action of the wind, the cylindrical box body 1 will generate the wind-induced vibration. At this time, the deformation of the flexible housing members 101 on the bottom and top surfaces will cause change in stress in the piezoelectric membrane 4 on its inner surface, further causing change in voltage between the upper and lower electrodes of the piezoelectric membrane 4, which can supply power to loads through a subsequent management circuit.

Embodiment 3

Figure 3:
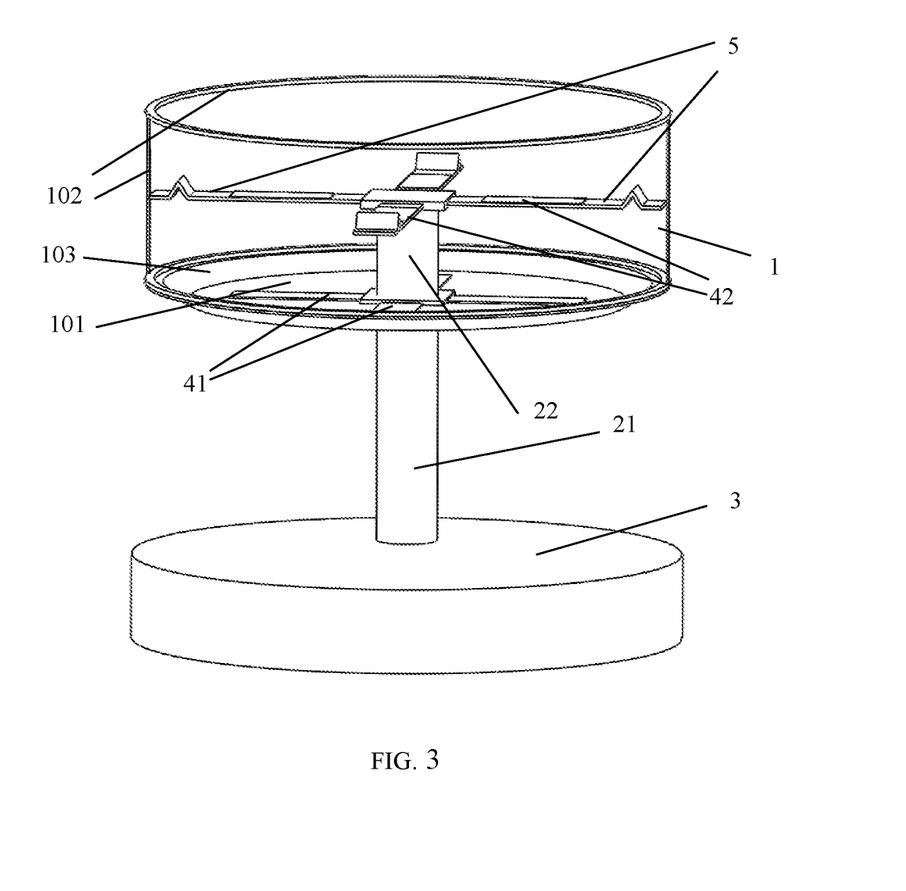
FIG. 3 is a schematic diagram of a piezoelectric wind power generation device according to Embodiment 3 of the present disclosure.

Referring to FIG. 3, on a basis of Embodiment 1, a plurality of piezoelectric composite beams 5 including piezoelectric membranes 42 are added inside the cylindrical box body 1. Ends of the piezoelectric composite beams 5 are fixed to a side wall of the box body 1 (i.e., the rigid housing member 102), and the other ends of the piezoelectric composite beams are fixed to the second connection member 22. A part of a beam surface of the piezoelectric composite beam 5 is adhered with the piezoelectric membrane 42, and upper and lower surfaces of the piezoelectric membrane 42 are deposited with metal electrodes respectively. At this time, the box body 1 is fixed to the first connection member 21 through the flexible housing member 101 on the bottom surface and to the second connection member 22 through the piezoelectric composite beam 5. The first connection member and the second connection member are fixed together at the flexible housing member on the bottom surface, that is to say, the second connection member is indirectly fixed to the base through the first connection member. When the box body 1 vibrates, the rigid housing member 102 does not deform, and the vibration of the box body 1 is completely caused by the deformation of the flexible housing member 101 on the bottom surface and the piezoelectric composite beam 5.

Under an action of the wind, the box body 1 will generate the wind-induced vibration. At this time, the deformation of the flexible housing member 101 on the bottom surface causes change in stress in the piezoelectric membrane 41 on its inner surface, deformation of the piezoelectric composite beam 5 will cause change in stress in its piezoelectric membrane 42, and voltages between the upper and lower electrodes of the piezoelectric membranes 41 and 42 will change, thus realizing power supplying to outside.

Embodiment 4

Figure 4:
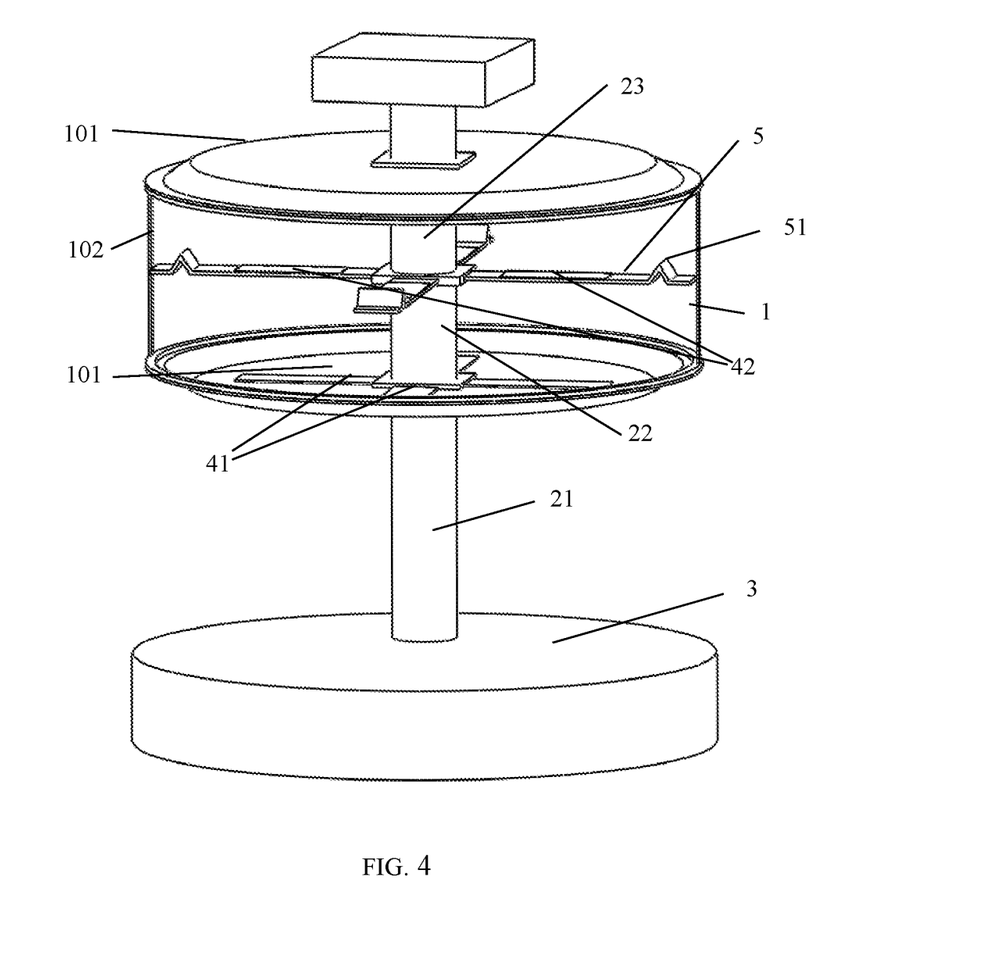
FIG. 4 is a schematic diagram of a piezoelectric wind power generation device according to Embodiment 4 of the present disclosure.

Referring to FIG. 4, on a basis of Embodiment 2, a plurality of piezoelectric composite beams 5 are added inside the cylindrical box body 1. At this time, the connection member is divided into three sections, namely a first connection member 21, a second connection member 22 and a third connection member 23. The first connection member 21 connects the flexible housing member 101 on the bottom surface with the base 3, a lower end of the second connection member 22 is fixed to the upper end of the first connection member 21, an end of the piezoelectric composite beam 5 is fixed to a side surface of the box body 1, the other end of the piezoelectric composite beam is fixed to the upper end of the second connection member 22. A lower end of the third connection member 23 is fixed to the upper end of the second connection member 22, an upper end of the third connection member 23 is fixed with the flexible housing member 101 on the top surface of the box body 1. Apart of a surface of the piezoelectric composite beam 5 is adhered with a piezoelectric membrane 42, and upper and lower surfaces of the piezoelectric membrane 42 are overlaid with metal electrodes respectively. An end of the piezoelectric composite beam is fixed to the second connection member, and the other end of the piezoelectric composite beam is provided with a bending 51 and connected with an inner wall of the rigid housing member. The box body 1 is fixed to the connection member through the flexible housing members 101 on the top and bottom surfaces and the piezoelectric composite beam 5. When the box body 1 vibrates, the rigid housing member 102 does not deform, and the vibration of the box body 1 is completely caused by the deformation of the flexible housing members 101 on the top and bottom surfaces and the piezoelectric composite beam 5.

Under an action of the wind, the box body 1 will generate wind-induced vibration on the first connection member 2. At this time, the deformation of the flexible housing member 101 on the top and bottom surfaces causes change in stress in the piezoelectric membrane 41 on its inner surface, deformation of the piezoelectric composite beam 5 will cause change in stress in its piezoelectric membrane 42, and voltages between the upper and lower electrodes of the piezoelectric membranes 41 and 42 will change, thus realizing power supplying to outside.

Embodiment 5

Figure 5:
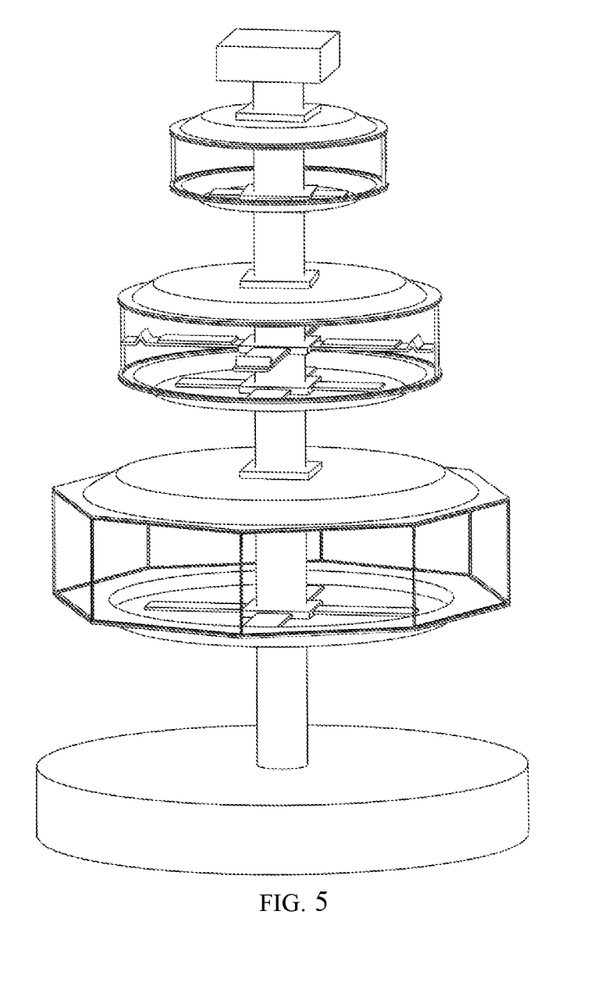
FIG. 5 is a schematic diagram of a piezoelectric wind power generation device array according to Embodiment 5 of the present disclosure.

Referring to FIG. 5, on a basis of Embodiment 1, 2, 3 and 4, a plurality of the above-mentioned piezoelectric wind power generation devices is connected using a same first connection member to form a series structure. The geometric dimension and shape of the box body 1 in this embodiment can be slightly different. A purpose of the above setting is to make the operating wind speed ranges and the wind direction ranges for respective box bodies in an array slightly different, and make the operating wind speed ranges and the wind direction ranges of two adjacent piezoelectric wind power generation devices be adjacent and have an overlapping interval, thus realizing continuous expansion of the operating wind speed range and the wind direction range for an array structure. That is, when the wind speed and the wind direction continuously vary in a large range, it is possible to ensure that at least one piezoelectric wind power generation device has a high electrical output. The first connection member is divided into a plurality of sections, and after the sections are connected together, the whole first connection member is not necessarily straight, and can be bent into a curved shape in a three-dimensional space as required. Using of this first curved connection member is beneficial to further broaden the wind speed range.

Embodiment 6

Figure 6:
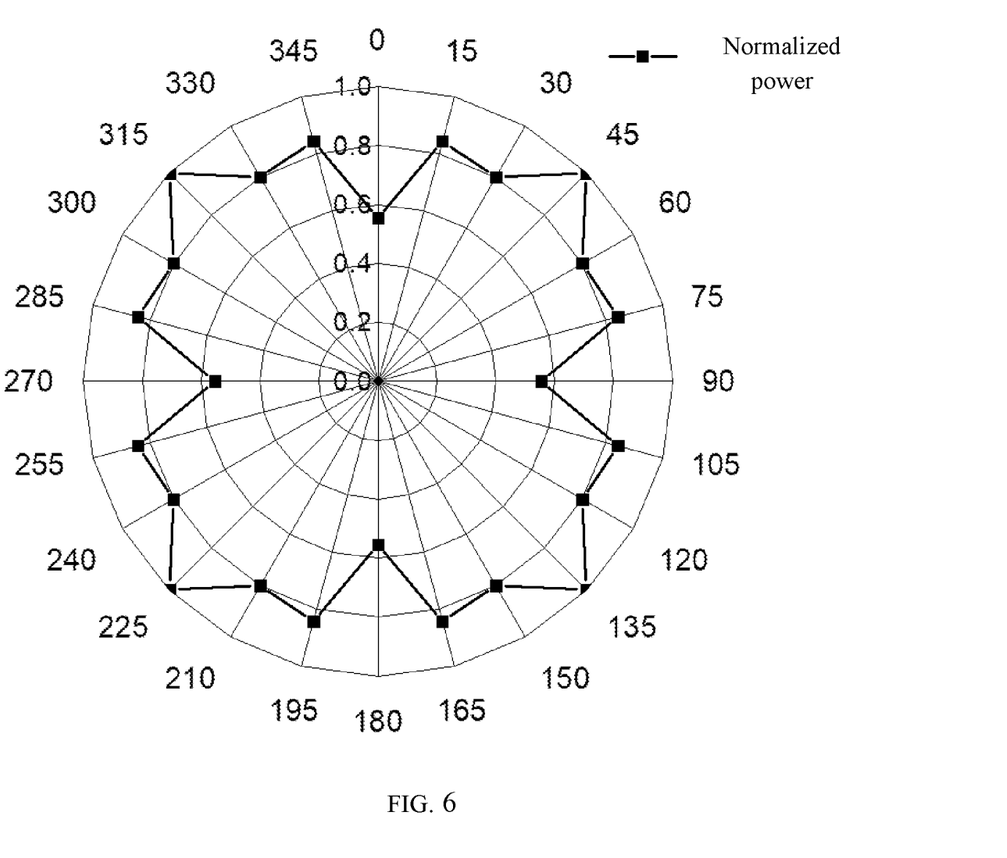
FIG. 6 is a graph showing a relationship between normalized total output power measured for the piezoelectric wind power generation device and a wind direction according to Embodiment 6 of the present disclosure.

On a basis of Embodiment 3, Embodiment 6 provides a box piezoelectric wind power generation device without the first energy harvesting unit on the flexible housing member (FIG. 3 shows the device without the piezoelectric membrane 4). Only differences will be explained below. The cylindrical box body has a diameter of 6 cm and a height of 2 cm, the rigid housing member is made of a polylactic acid film with a wall thickness of 0.4 mm, the flexible housing member directly adopts membrane of a rubber balloon, and four piezoelectric composite beams are arranged inside the box body. The piezoelectric composite beam is made by adhering a PVDF piezoelectric membrane with a thickness of 0.05 mm to the polylactic acid film with a thickness of 0.32 mm, and a width of the piezoelectric composite beam is 6 mm Performance of the power generation device provided in Embodiment 6 was tested in a wind tunnel. In this test, a wind speed was fixed at 10 m/s, and a wind direction could be adjusted as needed in a plane perpendicular to a side wall of the box body (for convenience of explanation, this plane is simply referred to as a horizontal plane). For convenience of analysis, a length direction of a certain piezoelectric composite beam was set to be 0°. For a specific wind direction, an output voltage of each composite beam to a 10 megohm load is measured, and then output power of each piezoelectric composite beam is calculated. A total output power of a wind direction prototype is obtained by adding up the output powers of the four piezoelectric composite beams. A relationship between the total output power and the wind direction can be obtained by changing the wind direction gradually in the horizontal plane, and repeating the above measuring process. A relationship between a normalized total output power and the wind direction when the wind direction changes in the horizontal plane can be obtained by dividing the total output power for different wind directions by the maximum value of the total output power. FIG. 6 shows a relationship curve between the normalized total output power and the wind direction when the wind speed is 10 m/s. It can be seen from FIG. 6 that when the wind direction changes arbitrarily in the horizontal plane, the minimum total output power of the power generation device is about 0.55 times of the maximum total output power, or the total output power is always kept above one-half of the maximum total output power. The one-half of the maximum power usually serves as a standard for directional evaluations of vibration energy collection and wind energy collection. According to this standard, the prototype has an ability to omni-directionally collecting wind energy in the horizontal plane. The above experimental results clearly show that the box piezoelectric wind energy collector provided in the disclosure has good multi-directional wind energy collection performance.

It should be understood by those skilled in the art that in the disclosure of the present invention, the orientation or positional relationship indicated by the terms "upper", "lower", "front", "rear", "left", "right", "vertical", "horizontal", "top", "bottom", "inner", "inner" and the like is based on the orientation or positional relationship shown in the drawings, which is only for the convenience of describing the disclosure and simplifying the description, but does not indicate or imply that the referred device or element must have a specific orientation, be constructed and operated in a specific orientation, and thus the above terms cannot be understood as limiting the disclosure.

Although the disclosure has been disclosed by the preferred embodiment in the above, it is not intended to limit the disclosure and any person familiar with the art can make some changes and embellishments without departing from the spirit and scope of the disclosure; therefore, the scope of protection of the disclosure should be subject to a scope of protection as claimed in the claims.

What is claimed is:

1. A box-type wind power generation device, comprising:
a box body comprising a flexible housing member and a rigid housing member, the flexible housing member and the rigid housing member enclosing to form at least one sealed cavity;
a first energy collecting unit comprising a piezoelectric membrane and electrodes deposited on both sides of the piezoelectric membrane, the first energy collecting unit overlying on an inner wall of the flexible housing member and being located in the sealed cavity, and
a first connection member, an end of the first connection member being fixed to the flexible housing member so that the first connection member is connected to the box body and at least a part of the first connection member is located outside the sealed cavity.

2. The box-type wind power generation device according to claim 1, wherein the first energy collecting unit extends from the end of the first connection member to an edge of the flexible housing member.

3. The box-type wind power generation device according to claim 2, wherein the flexible housing member has a contraflexure line formed by contraflexure points, and the first energy collection unit is located inside the contraflexure line.

4. The box-type wind power generation device according to claim 3, wherein at least a part of a bottom surface of the box body comprises the flexible housing member, a side surface of the box body is the rigid housing member, and at least a part of a top surface of the box body comprises the flexible housing member or the top surface of the box body is the rigid housing member.

5. The box-type wind power generation device according to claim 4, wherein a corrugated structure is provided at a connecting part of the flexible housing member and the rigid housing member on the bottom surface of the box body to move the contraflexure points outwards.

6. The box-type wind power generation device according to claim 4, wherein when at least a part of the top surface of the box body comprises the flexible housing member, there are a plurality of first energy collection units which are respectively arranged on the inner wall of the flexible housing member on the top and bottom surfaces of the box body; the box-type wind power generation device further comprises a second connection member, an end of the second connection member is fixed to an end of the first connection member, and the other end of the second connection member is fixed to the flexible housing member on the top surface of the box body.

7. The box-type wind power generation device according to claim 6, wherein the box-type wind power generation device further comprises a second energy collecting unit and the second energy collecting unit is a piezoelectric composite beam, and the second energy collecting unit is located in the sealed cavity, an end of the piezoelectric composite beam is fixed to a second connection member, and the other end of the piezoelectric composite beam is bent and connected with the inner wall of the rigid housing member.

8. The box-type wind power generation device according to claim 1, wherein the box body is an axisymmetrical body or a nonaxisymmetrical body in shape, the axisymmetrical body comprising a cylinder, a sphere, a cone, a truncated cone or a spherical cap, and the nonaxisymmetrical body comprising a prism or an elliptic cylinder.

9. The box-type wind power generation device according to claim 2, wherein the box body is an axisymmetrical body or a nonaxisymmetrical body in shape, the axisymmetrical body comprising a cylinder, a sphere, a cone, a truncated cone or a spherical cap, and the nonaxisymmetrical body comprising a prism or an elliptic cylinder.

10. The box-type wind power generation device according to claim 3, wherein the box body is an axisymmetrical body or a nonaxisymmetrical body in shape, the axisymmetrical body comprising a cylinder, a sphere, a cone, a truncated cone or a spherical cap, and the nonaxisymmetrical body comprising a prism or an elliptic cylinder.

11. The box-type wind power generation device according to claim 4, wherein the box body is an axisymmetrical body or a nonaxisymmetrical body in shape, the axisymmetrical body comprising a cylinder, a sphere, a cone, a truncated cone or a spherical cap, and the nonaxisymmetrical body comprising a prism or an elliptic cylinder.

12. The box-type wind power generation device according to claim 5, wherein the box body is an axisymmetrical body or a nonaxisymmetrical body in shape, the axisymmetrical body comprising a cylinder, a sphere, a cone, a truncated cone or a spherical cap, and the nonaxisymmetrical body comprising a prism or an elliptic cylinder.

13. The box-type wind power generation device according to claim 6, wherein the box body is an axisymmetrical body or a nonaxisymmetrical body in shape, the axisymmetrical body comprising a cylinder, a sphere, a cone, a truncated cone or a spherical cap, and the nonaxisymmetrical body comprising a prism or an elliptic cylinder.

14. A box-type wind power generation device, comprising:
- a box body, comprising a flexible housing member and a rigid housing member, the flexible housing member and the rigid housing member enclosing to form at least one sealed cavity;
- a first connection member, an end of the first connection member passing through the flexible housing member and into the sealed cavity; and
- a second energy collecting unit, located in the sealed cavity, an end of the second energy collecting unit being fixed to the first connection member, and the other end of the second energy collecting unit being connected with an inner wall of the rigid housing member.

15. A wind power generation device set, comprising:
- a plurality of box bodies, one or more of the box bodies comprising a flexible housing member and a rigid housing member, the flexible housing member and the rigid housing member enclosing to form at least one sealed cavity;
- a connection member connecting the flexible housing member of each box body in series; and
- a plurality of energy collection units provided in the sealed cavity, wherein one or more of the plurality of energy collection units are overlying on the inner walls of the flexible housing members of different box bodies or connected with the connection member.

* * * * *